United States Patent [19]

Mürjahn

[11] Patent Number: 4,560,251
[45] Date of Patent: Dec. 24, 1985

[54] ANTIGLARE SHIELD FOR EXTERIOR MIRRORS

[75] Inventor: Waldemar Mürjahn, Velbert, Fed. Rep. of Germany

[73] Assignee: Mignon-Media GmbH, Mettman, Fed. Rep. of Germany

[21] Appl. No.: 659,966

[22] Filed: Oct. 11, 1984

[30] Foreign Application Priority Data

Dec. 3, 1983 [DE] Fed. Rep. of Germany ... 8334768[U]

[51] Int. Cl.⁴ .............................................. B60J 3/00
[52] U.S. Cl. ................... 350/283; 296/97 R; 350/276 R
[58] Field of Search .................... 350/283, 276 R; 296/97 F, 97 R

[56] References Cited

U.S. PATENT DOCUMENTS 2,709,945  6/1955  Kuhn ............................. 350/283
3,025,098  3/1962  Andrews ....................... 296/97 R Primary Examiner—John K. Corbin
Assistant Examiner—Loha Ben
Attorney, Agent, or Firm—Bradford E. Kile

[57] ABSTRACT

An antiglare shield for exteriors mirrors on motor vehicles and includes an antiglare sheet, a stop and a section which is attachable to the inside of a vehicle window shaft.

6 Claims, 4 Drawing Figures

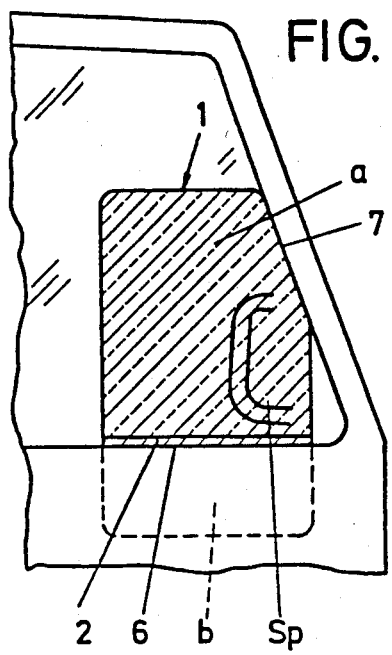
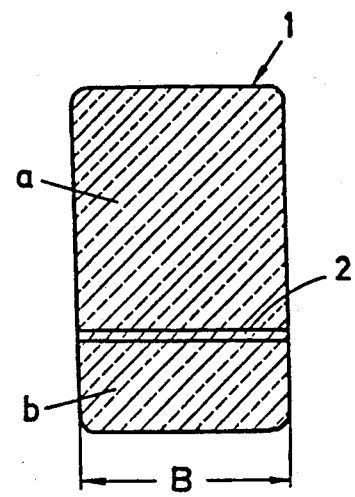
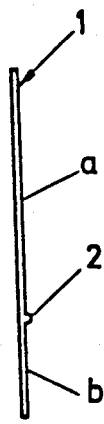
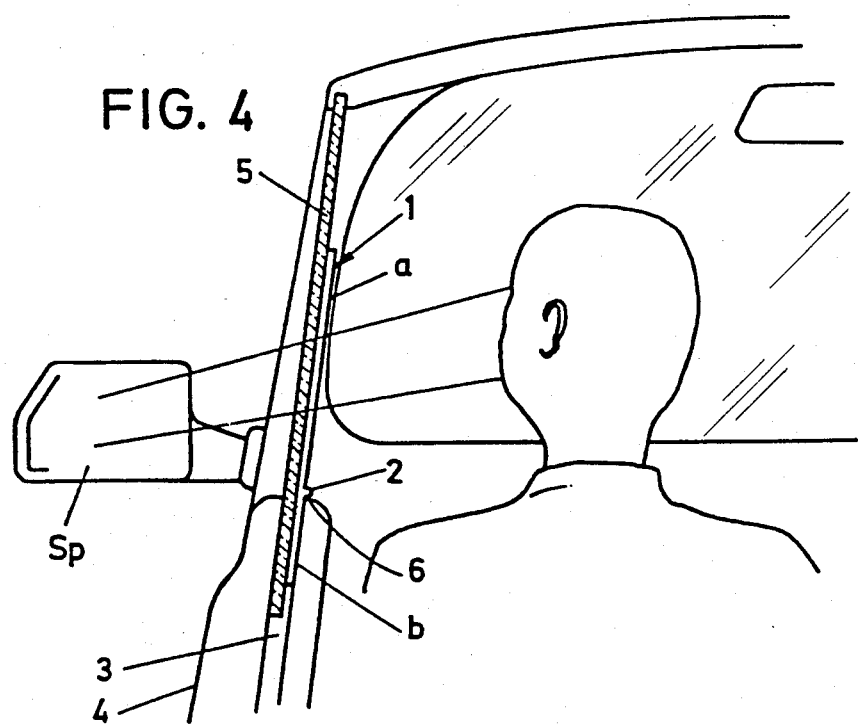

ANTIGLARE SHIELD FOR EXTERIOR MIRRORS

BACKGROUND OF THE INVENTION

The invention relates to an antiglare shield for exterior mirrors on motor vehicles.

Rear view mirrors inside motor vehicles can be adjusted by means of a flip mechanism on the mirror, so that a dimming of the reflection from the headlights of trailing vehicles occurs. Accordingly, the headlights of following motor vehicles no longer blinds the driver. There is no adequate antiglare device, however, for exterior mirrors on motor vehicles (right and left), although the headlights of following motor vehicles may also significantly impair the driver by glare from such exterior mirrors. For exterior mirrors that are adjustable from the vehicle interior an adjustment of the mirror may provide short-term relief. This however, may also impair the necessary rear vision.

On the other hand, it is common knowledge that tinting of motor vehicle windows reduces incident glare from daylight and—with that—the intensity of incident light from headlights. With moderate actinic daylight values, however, tinting is believed to be an irritant.

OBJECTS OF THE INVENTION

It is a general object of the invention to obviate or minimize problems of the type previously described.

It is a specific object to the invention to provide a device for minimizing headlight glare to a driver from outside rear view mirrors.

It is another object of the invention to provide an antiglare shield for exterior mirrors, which may be easily manufactured and which is of practical use, and which can be mounted easily and conveniently without special holding or adjustment elements.

It is yet a further object of the invention to provide an antiglare shield which may be facilely installed or removed by a motor vehicle operator as the shield is needed.

SUMMARY OF THE INVENTION

A preferred embodiment of the invention, intended to accomplish at least some of the foregoing objects, comprises a tinted antiglare shield mounted on the inside of the side door window, in the direction of sight between the driver and the exterior mirror. When the vehicle is in motion, this antiglare shield can—in spite of darkness—easily be installed in the gap between the window glass and the door. As the window for the vehicle door usually can be lowered into the vehicle window shaft, the antiglare shield—even when clamp-fitted too tightly—can be easily grasped and removed. Such an antiglare shield can, furthermore, be cut individually, with consideration given to the window shape and the shape of the window frames, respectively, and can thus be optimally fitted.

In one embodiment, an insertion stop guarantees a constantly correct, slip-proof alignment for the reflected field of vision. The insertion stop may be constructed to advantage by the formation of lateral insertion catches, which are mounted in the interior of the vehicle, on the upper rim of the vehicle window shaft. These catches may, for example, be in the shape of pins. With thermoplastic material it is even possible to have the user himself give the final shape to the catches.

The partial section for insertion can be equipped with an imprint or a stamp, for example, in the form of instructions or printed commercial messages. This simultaneously serves as a foolproof reference. The simple and practical design of the antiglare shield lends itself to be used as a welcome and danger-reducing advertisement gift. The dimming of the reflections can be achieved by adding darkened pigments to a plastic composition utilized for the production of the antiglare shield. A corresponding dimming may also be realized by coating a transparent plastic foil with a tinted layer. An advantageous solution consists of achieving the antiglare effect by means of a screen imprinted on the transparent foil. Beyond that it is possible to equip the antiglare shield with a grooved structure, which brings about the antiglare effect by refracting the light. Such a grooved structure also contributes to the stabilization of the surface.

The previous insertion stop may consist of a continuous molding, which may simultaneously separate the section imprinted with an advertisement—clearly visible—from the unsupported section.

THE DRAWINGS

FIG. 1 is a front view of an antiglare shield in accordance with a preferred embodiment of the invention;

FIG. 2 is a side view of the antiglare shield depicted in FIG. 1;

FIG. 3 is an antiglare shield cut to fit, and adjusted to be inserted, into a window casing of a vehicle; and FIG. 4 is a pictorial view, partially shown in cross-section, of a vehicle door with an antiglare shield in accordance with the invention inserted into the window frame.

DETAILED DESCRIPTION

Referring now to drawings wherein like numerals indicate like parts, FIGS. 1 and 2 disclose an antiglare shield 1, which essentially is a flat-surfaced plane consisting of substantially transparent plastic. The antiglare shield is initially cut rectangularly. When in use, the longer sides of the rectangle are vertical. Its surface is divided into an unsupported section "a" and a support section "b", which serves as an insertion flap. The latter may contain information regarding instructions or origin, and/or serve as an advertising surface.

The depth of insertion may be characterized by, a molding 2, stretching along the entire width B of the shield. The molding 2 meets an upper rim 6 of the vehicle window shaft 3 during insertion of the antiglare shield into the vehicle window shaft 3. The antiglare shield extends on the inside of the window 5 and any tendency for tilting of the antiglare shield 1, or horizontal shifting, is minimized because of the clamp fit between the window 5 and the corresponding interior wall of the vehicle window shaft 3. This clamp fit is further strengthened by a commonly used rubber or plastic lip in the area of the upper rim 6 of the vehicle window.

The antiglare shield is preferably composed of a flexible plastic material, and it may be inserted—by means of partially bending it parallel to the window surface—without the necessity of rolling down the window. It may be more advantageous, for example when using a more stable foil material, however, to lower the window 5 below the level of the unsupported section in order for the antiglare foil to be grasped. The smoothness of the window prevents the clamp-fitted foil from riding up when the window is rolled up again.

As shown in FIG. 3 the antiglare shield may be cut to fit individual vehicle window frames. A cutting line in FIG. 3 is shown at 7. The basic cut out of the antiglare foil section is designed by the manufacturer in such a way that in spite of the outer contour form changes a partial section "a" remains, i.e., a surface, which includes the reflected field of vision of an operator. An exterior mirror is shown as "Sp". All corners of the antiglare shield 1 are convexly rounded.

Tinting of the plastic can be achieved with the addition of pigments. Instead of a coloration it is also possible to coat the plastic with a film or foil or with a second tinted layer. Another process that may be employed, is the imprinting of a screen layer. This imprinting process may be executed simultaneously with imprinting of the partial section "b", which serves as the insertion flap.

Finally, there is also the possibility to provide the antiglare shield with a grooved structure. The grooved structure, which is not shown, results in an antiglare effect through the refraction of light. The molding 2 may be adjusted to fit into the grooved structure.

In describing the invention, reference has been made to preferred embodiments and illustrative advantages of the invention. Those skilled in the art, however, and familiar with the instant disclosure of the subject invention, may recognize additions, deletions, modifications, substitutions and/or other changes which will fall within the purview of the subject invention and claims.

I claim:

1. An antiglare shield for exterior rear view mirrors on motor vehicles, said shield comprising:
    an antiglare sheet composed of a substantially transparent plastic material and being composed of:
        a support section operable to be inserted inside of a vehicle window shaft, and
        an exposed antiglare section operable to extend along a side window surface of a motor vehicle and corresponding in size at least to the size of an area covering a reflected field of vision of an operator of the motor vehicle from an enterior rear view mirror; and
    stop mean connected to said antiglare sheet for limiting the extent of insertion of the support section inside the vehicle window shaft.

2. An antiglare shield for an exterior rear view mirror on a motor vehicle as defined in claim 1 wherein:
    said plastic sheet is tinted by the addition of pigments.

3. An antiglare shield for an exterior rear view mirror on a motor vehicle as defined in claim 1 wherein:
    said plastic sheet is covered by a glare resistant coating.

4. An antiglare shield for an exterior rear view mirror on a motor vehicle as defined in claim 1 wherein:
    said plastic sheet is covered with a substantially transparent foil imprinted with a screen layer to reduce glare.

5. An antiglare shield for an exterior rear view mirror on a motor vehicle as defined in claim 1 wherein:
    said plastic sheet is covered with a grooved antiglare shield foil.

6. An antiglare shield for an exterior rear view mirror on a motor vehicle as defined in claim 1 wherein:
    said stop means comprises a continuous molding across said antiglare sheet between said support section and said exposed antiglare section.

* * * * *